United States Patent
Hall et al.

(10) Patent No.: US 12,452,135 B2
(45) Date of Patent: *Oct. 21, 2025

(54) CUSTOMIZABLE USER INTERFACE FOR CONTROLLING COMPUTER NETWORK CAPACITY

(71) Applicant: Truist Bank, Charlotte, NC (US)

(72) Inventors: Kenneth Hall, Raleigh, NC (US); Bobby Len Robins, Roswell, GA (US)

(73) Assignee: Truist Bank, Charlotte, NC (US)

( * ) Notice: Subject to any disclaimer, the term of this patent is extended or adjusted under 35 U.S.C. 154(b) by 1 day.

This patent is subject to a terminal disclaimer.

(21) Appl. No.: 18/584,287

(22) Filed: Feb. 22, 2024

(65) Prior Publication Data

US 2024/0195698 A1   Jun. 13, 2024

Related U.S. Application Data

(63) Continuation of application No. 17/838,916, filed on Jun. 13, 2022, now Pat. No. 11,943,112.

(51) Int. Cl.
| | |
|---|---|
| *G06F 15/16* | (2006.01) |
| *H04L 41/082* | (2022.01) |
| *H04L 41/12* | (2022.01) |
| *H04L 41/16* | (2022.01) |
| *H04L 41/22* | (2022.01) |

(52) U.S. Cl.
CPC ............ *H04L 41/12* (2013.01); *H04L 41/082* (2013.01); *H04L 41/16* (2013.01); *H04L 41/22* (2013.01)

(58) Field of Classification Search
CPC ...... H04L 41/16; H04L 41/147; H04L 41/145
See application file for complete search history.

(56) References Cited

U.S. PATENT DOCUMENTS

| | | | |
|---|---|---|---|
| 11,252,029 B1* | 2/2022 | Ahuja | H04L 41/145 |
| 2005/0143077 A1* | 6/2005 | Charbonneau | H04W 16/20 |
| | | | 455/446 |
| 2008/0155087 A1* | 6/2008 | Blouin | H04L 41/5006 |
| | | | 709/223 |
| 2009/0043666 A1* | 2/2009 | Malik | G06Q 30/0633 |
| | | | 705/26.8 |
| 2021/0012200 A1 | 1/2021 | Lyske et al. | |
| 2021/0120023 A1 | 4/2021 | Gupta et al. | |

OTHER PUBLICATIONS

Non-Final Office Action, U.S. Appl. No. 17/838,916, Aug. 9, 2023, 10 pages.
Notice of Allowance, U.S. Appl. No. 17/838,916, filed Jan. 5, 2024, 18 pages.

* cited by examiner

*Primary Examiner* — Padma Mundur
(74) *Attorney, Agent, or Firm* — Kilpatrick Townsend & Stockton LLP; Michael A. Springs, Esq.

(57) ABSTRACT

A system can receive network build sheets corresponding to proposed network architectures for a computer network. The system can aggregate the network build sheets to generate the holistic build data for the computer network. The system can receive a request to access a user interface for displaying the holistic build data. The system can determine an access level associated with the request. The system can generate the user interface that includes a graphical representation of at least a portion of the holistic build data. The graphical representation can be customized based on the determined access level.

20 Claims, 6 Drawing Sheets

CUSTOMIZABLE USER INTERFACE FOR CONTROLLING COMPUTER NETWORK CAPACITY

CROSS-REFERENCE TO RELATED APPLICATIONS

This is a continuation of U.S. application Ser. No. 17/838,916, filed Jun. 13, 2022, entitled "CUSTOMIZABLE USER INTERFACE FOR CONTROLLING COMPUTER NETWORK CAPACITY," the entirety of which is hereby incorporated herein by reference.

TECHNICAL FIELD

The present disclosure relates computer network technology and, more particularly (although not necessarily exclusively), to providing holistic build data of a computer network via a customizable user interface for controlling computing network capacity.

BACKGROUND

A computer network can experience varying demand for computing resources such as memory, processing power, and the like. For example, over a period of time, the computer network can experience an increase in demand for memory and processing power, etc. System architects can generate proposed architectures for the computer network, but the system architects may not communicate well with one another and may generate proposed architectures for dissimilar subsets or subnetworks of the overall computer network. Additionally, the proposed architectures for the dissimilar subsets of the overall computer network may not be equally accessible.

SUMMARY

In one example, a system can receive network build sheets corresponding to proposed network architectures for a computer network. The system can aggregate the network build sheets to generate the holistic build data for the computer network. The system can receive a request to access a user interface for displaying the holistic build data. The system can determine an access level associated with the request. The system can generate the user interface that includes a graphical representation of at least a portion of the holistic build data. The graphical representation can be customized based on the determined access level.

In another example, a plurality of network build sheets can be received that are generated by a network design tool based on a plurality of network architectures input to the network design tool by one or more system architects. Each network build sheet of the plurality of network build sheets can correspond to a proposed respective network architecture for a respective subpart of an overall computer network. The proposed respective network architecture can indicate an anticipated computing demand for the respective subpart of the overall computer network, and the proposed respective network architecture can be designed by the one or more system architects using the network design tool. The plurality of network build sheets can be aggregated to generate holistic build data for the overall computer network. A request from a user can be received to access a graphical user interface configured to display the holistic build data. An access level associated with the user can be determined. The graphical user interface can be generated. The graphical user interface can include a graphical representation of at least a portion of the holistic build data, and the graphical representation can be customized based on the access level associated with the user.

In a further example, a non-transitory computer-readable medium can include instructions that are executable by a processor for causing the processor to perform various operations. A plurality of network build sheets can be received that are generated by a network design tool based on a plurality of network architectures input to the network design tool by one or more system architects. Each network build sheet of the plurality of network build sheets can correspond to a proposed respective network architecture for a respective subpart of an overall computer network. The proposed respective network architecture can indicate an anticipated computing demand for the respective subpart of the overall computer network, and the proposed respective network architecture can be designed by the one or more system architects using the network design tool. The plurality of network build sheets can be aggregated to generate holistic build data for the overall computer network. A request from a user can be received to access a graphical user interface configured to display the holistic build data. An access level associated with the user can be determined. The graphical user interface can be generated. The graphical user interface can include a graphical representation of at least a portion of the holistic build data, and the graphical representation can be customized based on the access level associated with the user.

DETAILED DESCRIPTION

Certain aspects and features relate to a customizable user interface for providing customized access to holistic build data about an overall computer network for controlling capacity of the overall computer network. The holistic build data can be generated by aggregating one or more sets of network build sheets representing subparts (e.g., subnets) of the overall computer network. The network build sheets may each model or otherwise represent a proposed network architecture for at least a portion of the overall computer network. A proposed network architecture can be different from an existing network architecture, in that a proposed network architecture can be a network architecture that is to be constructed at a future point in time to achieve a goal. A proposed network architecture can include a proposed hardware architecture for the corresponding subpart of the overall computer network. In some examples, the network build sheets can be generated by one or more system architects using a network design tool that allows the system architect to generate the proposed network architecture. Once the network build sheets have been created and processed by the system, the customizable user interface may be accessed by a user, such as a system architect, a manager or executive, or other suitable entity for viewing at least a portion of the holistic build data. The user interface may be configured to display a customized graphical representation of at least a portion of the holistic build data. The graphical user interface can be customized based on the access level of the user. For example, a first user with a first level of access may access the user interface having a first graphical representation of the holistic build data, and a second user with a second level of access may access the user interface having a second graphical representation of the holistic build data that is different than the first graphical representation, etc. The customized graphical representation may be used to control a hardware acquisition process for acquiring computer hardware to meet the computing demand anticipated for the proposed network architectures of the overall computer network.

A computer network can undergo various changes through time. For example, an amount of computing demand may increase as the number of entities that use the computer network also increases. Determining projected or proposed architectures for the computer network can facilitate meeting the projected or otherwise changing computing demand. The system architects may tend to work on their own parts of the project isolated from the other system architects, which can create problems. For example, designs may not be compatible with one another, and this isolation makes it difficult to obtain any visibility into the overall consumption of the computer network as a whole. For example, each system architect may be assigned a different subset (e.g., subnet, subpart, etc.) of the computer network, and each proposed network architecture may correspond to the different subset of the computer network.

A system can be used to generate and provide holistic build data based on the proposed network architectures. For example, the system can receive network build sheets based on proposed network architectures from a set of different system architects or other suitable entities, and the system can aggregate the proposed network architectures to generate the holistic build data about the computer network. The system architects can generate the network build sheets using a network design tool, which can then automatically generate the network build sheets based on the network architecture designs. For example, a system architect can use the network design tool to design a proposed network architecture for a subpart of an overall computer network based on certain project specifications. The design process may be a dynamic one in which the system architect is designing and refining the proposed network architecture over time. As the system architect continues the design process, the network design tool can automatically generate and store corresponding build sheets at various checkpoints throughout the process. These build sheets can be considered partial build sheets, because they may be incomplete and represent only a part of the proposed network architecture.

As a result of this dynamic process, a single proposed network architecture may have multiple corresponding build sheets generated and stored at different points along the design process. In some examples, the system can aggregate such build sheets corresponding to one or more proposed network architectures and use them to construct holistic build data. The holistic build data may indicate important information about the overall computer network, such as a proposed network architecture of the overall computer network, projected computing demand of the overall computer network, or a combination thereof.

The system can provide the holistic build data using a graphical user interface, and the graphical user interface can be customized. For example, the graphical user interface can include one or more customizable graphical representations. In some examples, the system can generate the customizable graphical representations using the holistic build data. For example, each customizable graphical representation of the customizable graphical representations may correspond to or otherwise represent a different subset of the computer network. Additionally or alternatively, each customizable graphical representation may include different levels of detail relating to its corresponding subset of the computer network. The system can generate the customizable graphical representations based on a level of access of a user requesting access to the holistic build data. For example, a first user may request access to the graphical user interface and may be associated with a first level of access, and a second user may request access to the graphical user interface and may be associated with a second level of access. The system can generate, for the first user, the graphical user interface with a first graphical representation based on the first level of access, and the system can generate, for the second user, the graphical user interface with a second graphical representation based on the second level of access. In some examples, the first graphical representation can be different than the second graphical representation.

The graphical representations in the graphical user interface can be used control a hardware acquisition process for obtaining computer hardware for the computer network so as to satisfy the projected computing demands of the computer network. For example, the graphical user interface can include a graphical representation of holistic build data based on network build sheets of the computer network. The network build sheets can correspond to proposed network architectures that indicate respective projected computing demand for respective subsets of the computer network. Based on the projected computing demand, an entity can determine whether or how much (and of what type of) computing hardware to acquire to meet the projected computing demand. In some examples, the system can automatically control the hardware acquisition process or generate support tickets for acquiring the necessary computing hardware.

These illustrative examples are given to introduce the reader to the general subject matter discussed here and are not intended to limit the scope of the disclosed concepts. In the following description, for the purposes of explanation, specific details are set forth in order to provide a thorough understanding of various implementations and examples. Various implementations may be practiced without these specific details. The figures and description are not intended to be restrictive.

Figure 1:
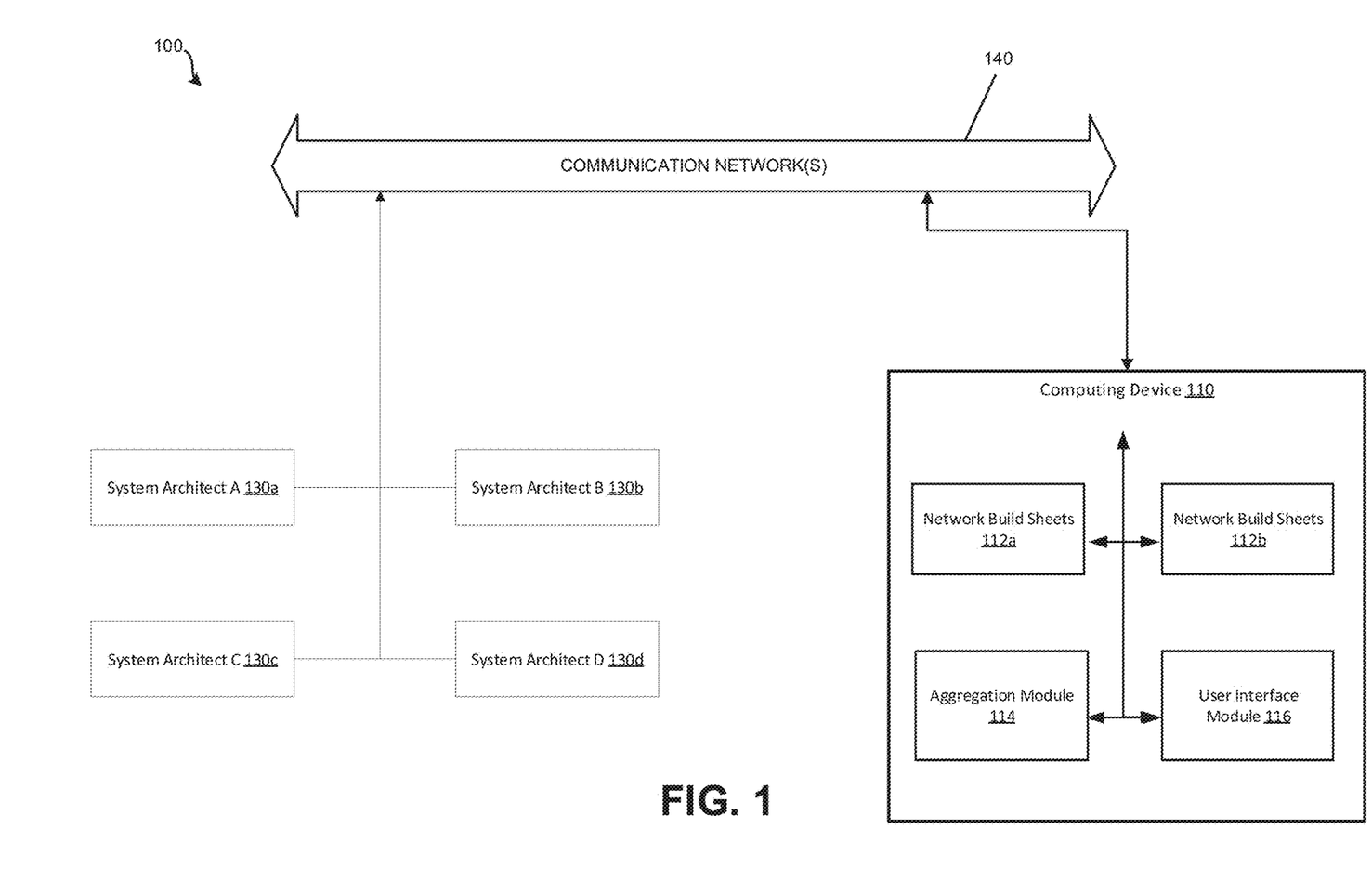
FIG. 1 is a schematic of a network environment in which network build sheets can be generated and aggregated according to one aspect of the present disclosure.

FIG. 1 is a schematic of a network environment 100 in which network build sheets can be generated and aggregated according to one aspect of the present disclosure. Included in the network environment 100 are a computing device 110 and system architects 130*a-d*. The network environment 100 may correspond to a Wide Area Network ("WAN") environment, such as the Internet, through which the system architects 130, for example via individual computing devices, may communicate with the computing device 110 via web browsers or client-side applications, to establish communication sessions, request and receive various computing resources, and access other features of applications or services such as a network design tool. In some examples, the computing devices used by the system architects 130 may include or otherwise provide the network design tool. The system architects 130 need not be formally trained system architects and can include any users that facilitate construction of a proposed network architecture.

The computing device 110 may be or otherwise include any type of computing device such as a personal computer, tablet, mobile device, or server that can include, for example, a rack server, a tower server, a miniature server, a blade server, a mini rack server, a mobile server, an ultra-dense server, a super server, etc. The computing device 110 may include various hardware components such as, for example, a motherboard, processing units, memory systems, hard drives, network interfaces, power supplies, etc. In examples in which the computing device 110 is or otherwise includes a server, the computing device 110 may include one or more server farms, clusters, or any other appropriate arrangement or combination of computer servers. Additionally, the computing device 110 may act according to stored instructions located in a memory subsystem of the computing device 110 and may execute an operating system or other suitable applications. In some examples, the computing device 110 may be or otherwise include a cloud-hosted system that exists on a server-less, cloud-based environment.

The computing device 110 may implement several different applications and services, and perform additional server-side functionality, including by an aggregation module 114, a user interface module 116, etc. For example, the computing device 110 can include network build sheets 112*a-b* that can be received from one or more of the system architects 130*a-d*. The aggregation module 114 can receive the network build sheets 112*a-b* and can aggregate or otherwise combine the network build sheets 112*a-b* to generate the holistic build data relating to a computer network. Additionally, the computing device 110 can use the user interface module 116 to provide at least a portion of the holistic build data via a user interface that can include a customizable graphical representation of holistic build data based on network architectures represented by the network build sheets 112*a-b*.

The system architects 130*a-d* can use one or more user devices, which can include suitable user devices for accessing web-based resources or application-based resources and can be capable of accessing and establishing communication sessions with the computing device 110 through the communication networks 140, to generate the proposed network architectures. In some examples, the user devices of the system architects 130*a-d* can include or otherwise correspond to mobile devices, including tablet computers, smartphones, and smart watches, which may access the computing device 110 via a Local Area Network ("LAN") or Wide Area Network (WAN), as well as mobile telecommunication networks, short-range wireless networks, or various other communication network types such as cable or satellite networks. Although certain examples herein are described in terms of mobile devices, in other examples, the system architects 130*a-d* may additionally or alternatively use other mobile or non-mobile computing devices, such as desktop computers, laptop computers, and the like, capable of accessing the computing device 110 via the communications network 140 and executing the network design tool for generating the network build sheets 112*a-b*.

Although certain components and entities are illustrated in FIG. 1, other suitable entities and suitable, compatible, network hardware components and network architecture designs may be implemented in various embodiments to support providing the holistic build data via the customizable user interface. The communication network 140, or any suitable alternative, may be any type of network that can support data communications using any of a variety of commercially-available protocols, including, without limitation, TCP/IP (transmission control protocol/Internet protocol), SNA (systems network architecture), IPX (Internet packet exchange), Secure Sockets Layer (SSL) or Transport Layer Security (TLS) protocols, Hyper Text Transfer Protocol (HTTP) and Secure Hyper Text Transfer Protocol (HTTPS), Bluetooth®, Near Field Communication (NFC), and the like. Merely by way of example, the network(s) connecting the user devices of the system architects 130*a-d* and the computing device 110 in FIG. 1 may be local area networks (LANs), such as one based on Ethernet, Token-Ring or the like. Such network(s) also may be wide-area networks, such as the Internet, or may include financial/banking networks, telecommunication networks such as a public switched telephone networks (PSTNs), cellular or other wireless networks, satellite networks, television/cable networks, or virtual networks such as an intranet or an extranet. Infrared and wireless networks (e.g., using the Institute of Electrical and Electronics (IEEE) 802.11 protocol suite or other wireless protocols) also may be included in these communication networks.

Figure 2:
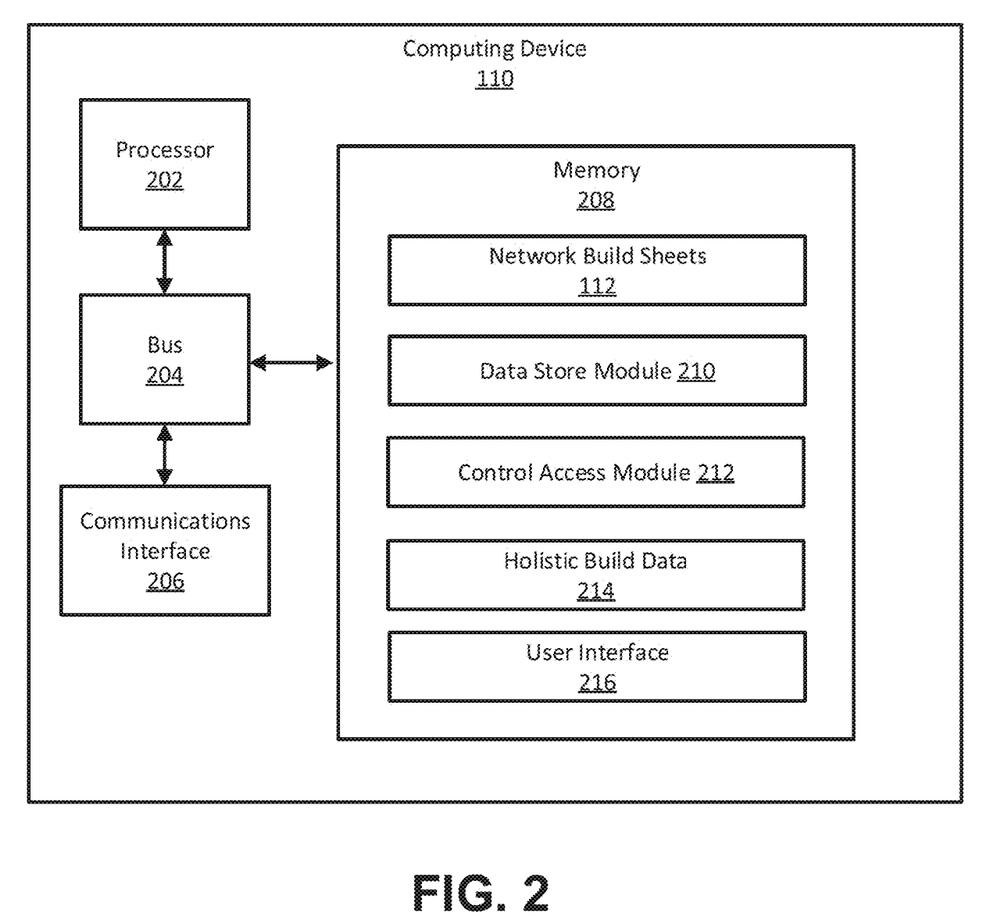
FIG. 2 is a block diagram of an example of a computing device configured to aggregate network build sheets and provide holistic build data via a customizable user interface for controlling capacity of an overall computer network according to one example of the present disclosure.

FIG. 2 is a block diagram of an example of a computing device 110 configured to aggregate network build sheets 112 and provide holistic build data 214 via a customizable user interface 216 according to one example of the present disclosure. The computing device 110 may be a network device and may include a processor 202, a bus 204, a communications interface 206, a memory 208, and other suitable components. In some examples, the components illustrated in FIG. 2 may be integrated into a single structure. For example, the components can be within a single housing. In other examples, the components illustrated in FIG. 2 can be distributed, for example in separate housings and in electrical communication with each other.

The processor 202 may execute one or more operations for implementing various examples and embodiments described herein. The processor 202 can execute instructions stored in the memory 208 to perform the operations. The processor 202 can include one processing device or multiple processing devices. Non-limiting examples of the processor 202 include a Field-Programmable Gate Array ("FPGA"), an application-specific integrated circuit ("ASIC"), a microprocessor, etc.

The processor 202 may be communicatively coupled to the memory 208 via the bus 204. The non-volatile memory 208 may include any type of memory device that retains stored information when powered off. Non-limiting examples of the memory 208 include electrically erasable and programmable read-only memory ("EEPROM"), flash memory, or any other type of non-volatile memory. In some examples, at least some of the memory 208 may include a medium from which the processor 202 can read instructions. A computer-readable medium may include electronic, optical, magnetic, or other storage devices capable of providing the processor 202 with computer-readable instructions or other program code. Non-limiting examples of a computer-readable medium include magnetic disk(s), memory chip(s), ROM, random-access memory ("RAM"), an ASIC, a configured processor, optical storage, or any other medium from which a computer processor may read instructions. The instructions may include processor-specific instructions generated by a compiler or an interpreter from code written in any suitable computer-programming language, including, for example, C, C++, C#, Java, Perl, Python, etc.

The communications interface 206 may interface other network devices or network-capable devices to analyze and receive information related to the network build sheets 112, the holistic build data 214, and the like. Information received from the communications interface 206 may be sent to the memory 208 via the bus 204. The memory 208 can store any information received from the communications interface 206.

The memory 208 may include program code for receiving the network build sheets 112 and aggregating the network build sheets 112 for generating the holistic build data 214. The program code may cause the computing device 110, or any suitable component thereof, to generate a user interface 216 based on a request for accessing the holistic build data 214. The computing device 110, or any suitable component thereof, may determine a level of access associated with the request, and the computing device 110 can customize the user interface 216, or any elements thereon, based on the determined level of access. The memory 208 may additionally include program code for a data store module 210, a control access module 212, and any other suitable modules for performing the operations described herein. In some examples, the user interface 216 may be a customizable user interface that may be presented to a user on a user device for providing at least a portion of the holistic build data 214. In some examples, providing at least a portion of the holistic build data 214 may facilitate decisions about acquiring computing hardware for the computer network.

The data store module 210 may store information relating to a user account (e.g., username and password, security information, etc.) for a number of users and associated client devices, including originating IP addresses of login attempts, browser settings of login attempts, etc. In some examples, the data store module 210 may store levels of access associated with the user account for the number of users. For example, the data store module 210 may store indications of a level of access to the holistic build data 214 for respective users. The control access module 212 may include or be communicatively coupled to an authentication service and may validate whether a user access attempt to the holistic build data 214 or the user interface 216 has been successfully authenticated in response to receiving a request for access. In some examples, the control access module 212 may determine the level of access associated with the request based on data included in or otherwise received from the data store module 210. The results from the control access module 212 may be used by the computing device 110 to generate the user interface 216. For example, the computing device 110 can generate the user interface 216 and can customize the graphical representation of the holistic build data 214 based on the determined level of access of the user making the request.

Figure 3:
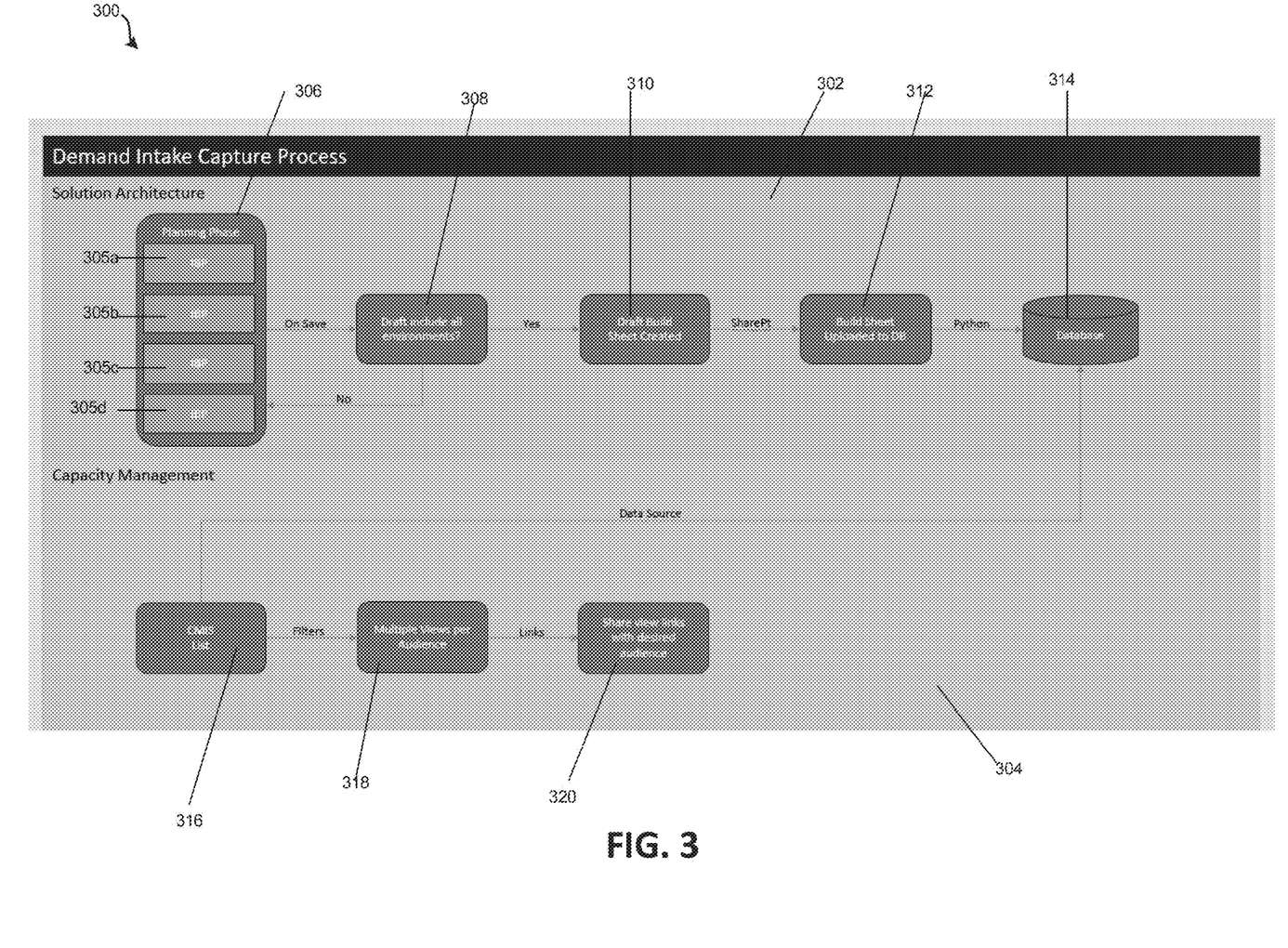
FIG. 3 is a data flow diagram of a process to aggregate network build sheets and provide holistic build data for controlling capacity of an overall computer network according to one example of the present disclosure.

FIG. 3 is a data flow diagram 300 of a process to aggregate network build sheets 112 and provide holistic build data 214 according to one example of the present disclosure. As illustrated, the data flow diagram 300 includes a first flow 302 and a second flow 304 that may be related.

The first flow 302 involves solution or network architecture for a computer network, and the second flow 304 involves capacity management for the computer network. The first flow 302 can begin with a planning phase 306. The planning phase 306 may involve one or more system architects 130. The system architects 130 can generate one or more proposed network architectures 305. As illustrated, four proposed network architectures 305a-d are included in the planning phase 306, but other suitable numbers, such as less than four or more than four, proposed network architectures 305a-d are possible. Each proposed network architecture 305 may be generated by the system architect 130, who may input the proposed network architecture 305 into a network design tool that can generate the network build sheet 112 (e.g., via the first flow 302). The proposed network architecture 305 may indicate an anticipated computing demand for a subset (e.g., subpart or subnet) of the computer network.

Upon the system architect 130 saving a draft of a proposed network architecture 305, the system architect 130 may be prompted, for example via the system described herein, to indicate whether the draft is complete (e.g., in the sense that it includes all of the required hardware components, even if the draft is not "final"). In some examples, the system architect 130, at block 308, can indicate either that the draft is complete (even if the draft is not "final") or that the draft is incomplete. In some examples in which the system architect 130 indicates that the draft is incomplete, the computing device 110 may not generate a corresponding build sheet. Alternatively, the computing device 110 or other suitable computing entity may generate, at block 310, a partial build sheet corresponding to the incomplete draft. In some examples in which the system architect 130 indicates that the draft is complete, the computing device 110 or other suitable computing entity may generate, at block 310, a network build sheet 112 based on the proposed network architecture 305.

At block 312, the computing device 110 or other suitable computing entity can upload the saved network build sheet 112 to a database 314, which may be configured to store one or more drafts of network build sheets 112. Any number and combination of computing devices can save network build sheets 112 to the database 314. In some examples, multiple network build sheets corresponding to multiple proposed network architectures associated with an overall computer network can be stored in the database 314.

In some examples, the computing device 110 can receive the network build sheets 112 from the database 314 and aggregate them to generate the holistic build data 214. Accordingly, the first flow 302 may involve a flow for planning or otherwise projecting a network architecture and computing demand for the computer network.

The second flow 304 may involve providing the holistic build data 214 for facilitating decisions about hardware of the computer network for meeting demand of the computer network. For example, at block 316, a user can request access to a user interface 216 that is configured to display or otherwise provide at least a portion of the holistic build data 214. At block 318, the computing device 110 can determine a level of access associated with the user. The level of access may be used to determine which portion or portions of the holistic build data 214 to display on the user interface 216. Additionally or alternatively, the level of access may be used to determine an amount of detail to provide for the provided portion of the holistic build data 214.

At block 320, the computing device 110 generates the user interface 216 with a graphical representation of the holistic build data 214. The computing device 110 can generate the graphical representation based on the determined level of access. The information included in the graphical representation can be used by an entity, such as the computing device 110 or a user, to control a hardware acquisition process. In some examples, the hardware acquisition process may or may not be automated. The hardware acquisition process can involve obtaining the computer hardware described in the holistic build data 214 to meet a projected or anticipated computing demand for the computer network. For example, the user can determine, from the graphical representation, an amount of projected or anticipated computing demand for the computer network, and the user can request or initiate a request for acquiring computing hardware for meeting the projected or anticipated computing demand with respect to the computer network. In some examples, the user interface 216 can include an amount of computer hardware for meeting the projected computing demand. In some examples, the computing device 110 automatically determines the amount of projected or anticipated computing demand for the computer network and can automatically request or initiate the request for acquiring computing hardware for meeting the computing demand.

Figure 4:
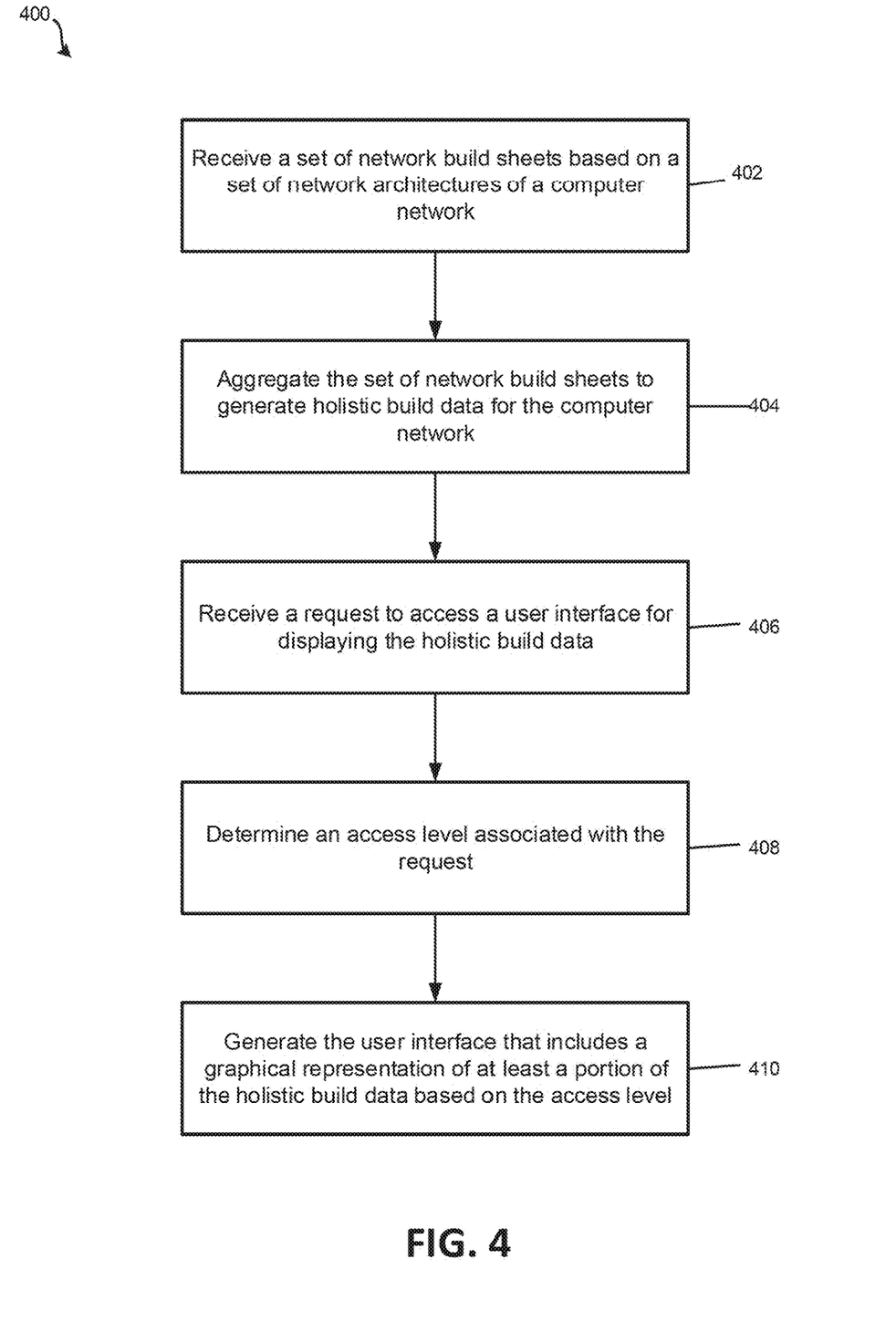
FIG. 4 is a flowchart of a process for aggregate network build sheets and provide holistic build data via a customizable user interface for controlling capacity of an overall computer network according to one example of the present disclosure.

FIG. 4 is a flowchart of a process 400 for aggregating network build sheets 112 and providing holistic build data 214 via a customizable user interface 216 according to one example of the present disclosure. At block 402, the computing device 110 receives a set of network build sheets 112 based on a set of proposed network architectures of a computer network. The set of network build sheets 112 may be generated, either directly or indirectly, by one or more system architects 130. For example, a system architect 130 can input one or more proposed network architectures into a network design tool that can be used to generate one or more network build sheets 112 based on the one or more proposed network architectures. In some examples, a proposed network architecture can represent a subset (e.g., of the hardware components) of the computer network. The proposed network architecture can indicate an anticipated computing demand associated with the subpart of the computer network.

At block 404, the computing device 110 aggregates the network build sheets 112. Any suitable number, for example one, two, three, four, five, or more, network build sheets 112 can be received by the computing device 110. The computing device 110 can aggregate the network build sheets 112 to generate the holistic build data 214. In some examples, the holistic build data 214 may represent a union of subparts or subsets of the computer network represented by the aggregated network build sheets 112. Aggregating the network build sheets 112 can involve combining the network build sheets 112 or otherwise suitably generating the holistic build data 214 of the computer network based on data included in the network build sheets 112.

At block 406, the computing device 110 receives a request to access a user interface 216 that is configured to provide at least a portion of the holistic build data 214. The request may be submitted by a user or other suitable entity for viewing or otherwise suitably using the holistic build data 214. In some examples, the computing device 110 receives authentication data, from the user, in addition to the request. The authentication information may indicate a type of user or other identifying information about the user that can be used to provide the holistic build data 214 via the user interface 216. In some examples, the request can include a request to view a portion of the holistic build data 214 or other suitable information for requesting the holistic build data 214 via the user interface 216.

At block 408, the computing device 110 determines an access level associated with the request received at the block 406. The computing device 110 may determine the access level based on the request, based on the user associated with the request, based on other suitable information relating to the request or the user, or based on any suitable combination thereof. For example, the computing device 110 can receive authentication data with the request, and the computing device 110 can use the authentication data to retrieve, for example from the data store module 210 or via the control access module 212, information about the request, the user, or a combination thereof. The retrieved information about the request or the user can be used to determine the access level associated with the request or the user.

At block 410, the computing device 110 generates the user interface 216 that includes a customized graphical representation of the holistic build data 214. In some examples, the graphical representation represents a portion of the holistic build data 214. The graphical representation can be customized, for example, based on the determined access level. For example, the computing device 110 can generate a first graphical representation of the holistic build data 214 based on a first access level, and the computing device 110 can generate a second graphical representation (e.g., different than the first graphical representation) of the holistic build data 214 based on a second access level. The first graphical representation and the second graphical representation may display different portions of the holistic build data 214 or different information of the same or similar portion of the holistic build data 214. In some examples, the first graphical representation can exclude information in the second graphical representation, and vice-versa.

In some examples, the graphical representation indicates, or can otherwise be used to determine, anticipated computing demand for the computer network. The computing device 110 can determine or otherwise generate a demand forecast with respect to the computer network. The demand forecast can include a projected computing demand for one or more subsets of the computer network at a time in the future. For example, the demand forecast can include the projected computing demand one, two, three, four, or more years in the future. Additionally, the computing device 110 can determine the demand forecast that can include computing demand of the computer network, or any subset thereof, at different intervals between a present time and the time in the future. For example, if the projected computing demand is for two years in the future, the computing device 110 may generate a demand forecast that includes projected computing demand for the computer network, or any subset thereof, every three months or any other suitable time interval between the present time and the time in the future. In some examples, the time intervals may be irregularly spaced apart. Additionally, the demand forecast can indicate a trend of computing demand from a present computing demand at the present time to the projected computing demand at the time in the future.

The customized graphical representation of the holistic build data 214 may be used to automatically control a computing-hardware-acquisition operation. For example, a user viewing the graphical representation of the holistic build data 214 may determine a type of computer hardware, an amount of computer hardware, and other suitable determinations for meeting the projected computing demand based on the graphical representation. In some examples, the computing device 110 may receive, as input, the graphical representation and may output a command or other suitable output for initiating or otherwise automatically controlling an operation for acquiring the type of computer hardware, the amount of computer hardware, and the like for meeting the projected computing demand of the computer network.

In some examples, the computing device 110 can implement machine-learning techniques to perform one or more of the operations of the process 400 or other suitable operations. For example, the computing device 110 can use a trained machine-learning model to determine the projected computing demand for the computer network, or any suitable component thereof, at the time in the future. The computing device 110 can input data that includes the network build sheets 112, the holistic build data 214, and the like into the trained machine-learning model. The computing device 110 can receive, as an output from the trained machine-learning model, the projected computing demand for at least a subset of the computer network at the time in the future. Additionally, the computing device 110 can train the machine-learning model. For example, the computing device 110 can generate, retrieve, or otherwise receive a training dataset that includes historical network build sheets and historical computing demand corresponding to the historical network build sheets. The computing device 110 can apply the training dataset to the machine-learning model to train the machine-learning model to output projections of computing demand for the computer network.

In some examples, the computing device 110 can use the trained machine-learning model to control or otherwise initiate a real-world operation. For example, the computing device 110 can use the trained machine-learning model to determine the type or amount of computer hardware to acquire for at least a subset of the computer network for meeting a projected computing demand at the time in the future. Additionally, the computing device 110 can use the machine-learning model to initiate a computer hardware-acquisition operation using the determined amount of computer hardware for satisfying the projected computing demand.

Figure 5:
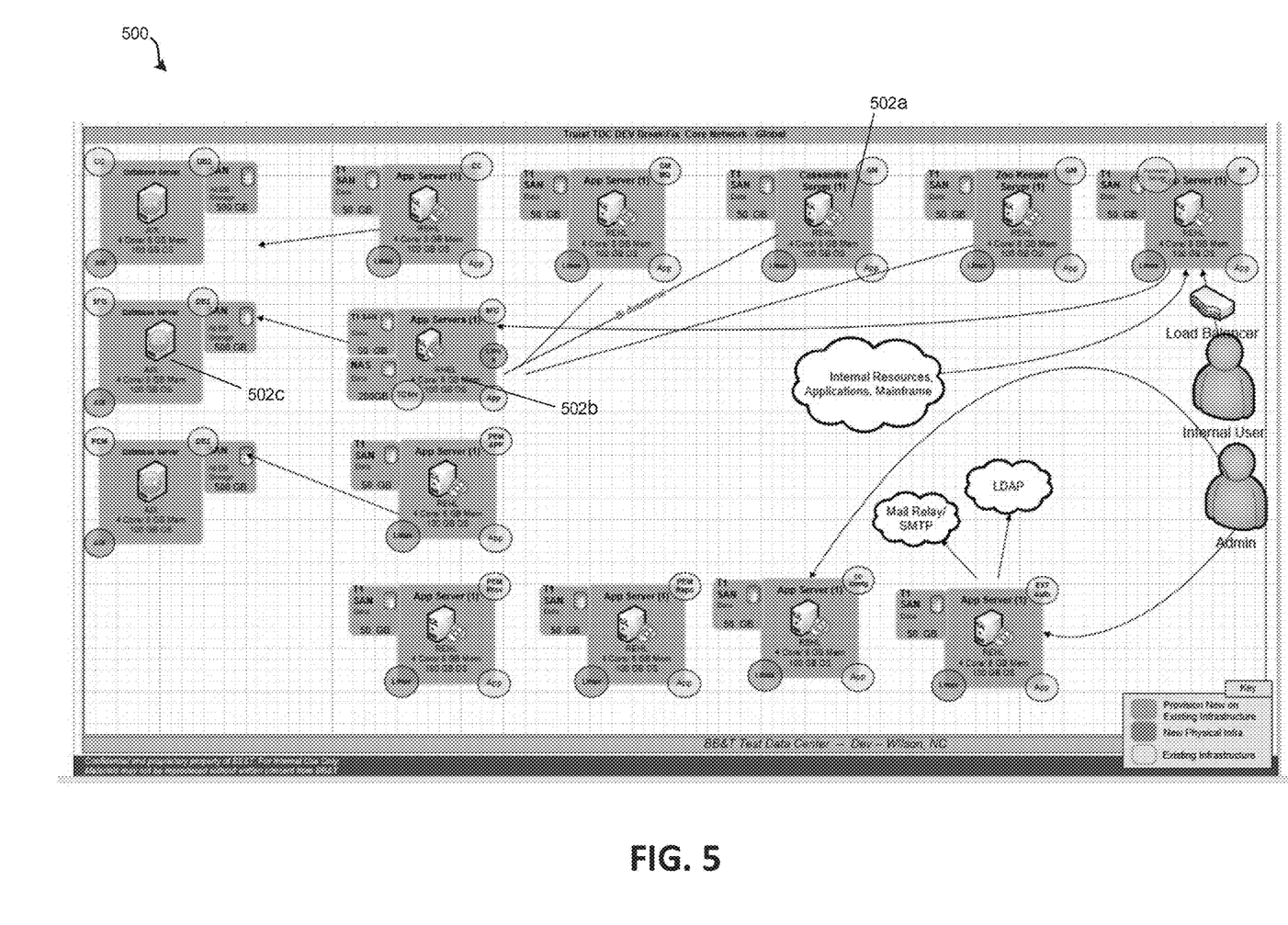
FIG. 5 is an example of a design tool usable to generate network build sheets for a computer network according to one example of the present disclosure.

FIG. 5 is an example of a design tool 500 usable to generate network build sheets 112 for a computer network according to one example of the present disclosure. As illustrated, the design tool 500 includes a graphical representation of computing devices corresponding to at least a subset of a computer network. The graphical representation can include a set of visual objects that represent different computing devices either included in the computer network or proposed to be included in the computer network. For example, and as illustrated, the graphical representations include visual objects 502a-c. The visual object 502a may represent a first computing device proposed to be in the computer network, the visual object 502b may represent a second computing device proposed to be in the computer network, and the visual object 502c may represent a third computing device proposed to be in the computer network. Each of the visual objects 502a-c may include data relevant to the respective computing device. For example, each of the visual objects 502a-c may include (i) a visual indicator of whether the computing device is existing, requested, or proposed, and (ii) details relating to the computing device such as an amount of existing or projected computing memory, existing or projected processing power, existing or projected usage, and the like. The visual objects 502a-c can include or otherwise illustrate any other suitable information about the respective computing devices of the computer network.

A system architect or other suitable entity can use the design tool 500 to drag-and-drop visual objects representing the computing devices on a canvas and arrange them into a network architecture design. The design tool 500 can then automatically generate one or more network build sheets 112 for the network architecture design based on the types, locations, and interconnections between the visual objects. For example, the system architect can generate a proposed network architecture for at least a subset of the computer network using the design tool 500. The system architect can design the proposed network architecture by positioning and interconnecting, on the canvas, one or more visual objects 502 representing proposed (or existing) computing devices for the subset of the computer network. The system architect can use the design tool 500 to create the proposed network architecture, and, upon receiving an input from the system architect indicating that the proposed network architecture is substantially complete (e.g., encompasses the desired subset of the computer network), the design tool 500 or any component of the computing device 110 can automatically generate the network build sheet 112. In some examples, the network build sheet 112 can be a processed version of the proposed network architecture. For example, the network build sheet 112 can include the proposed network architecture and other data and metadata (e.g., projected capacity, usage, etc.) for the subset of the computer network. The additional data and metadata may be derived from property values associated with the visual objects in the design tool 500.

Figure 6:
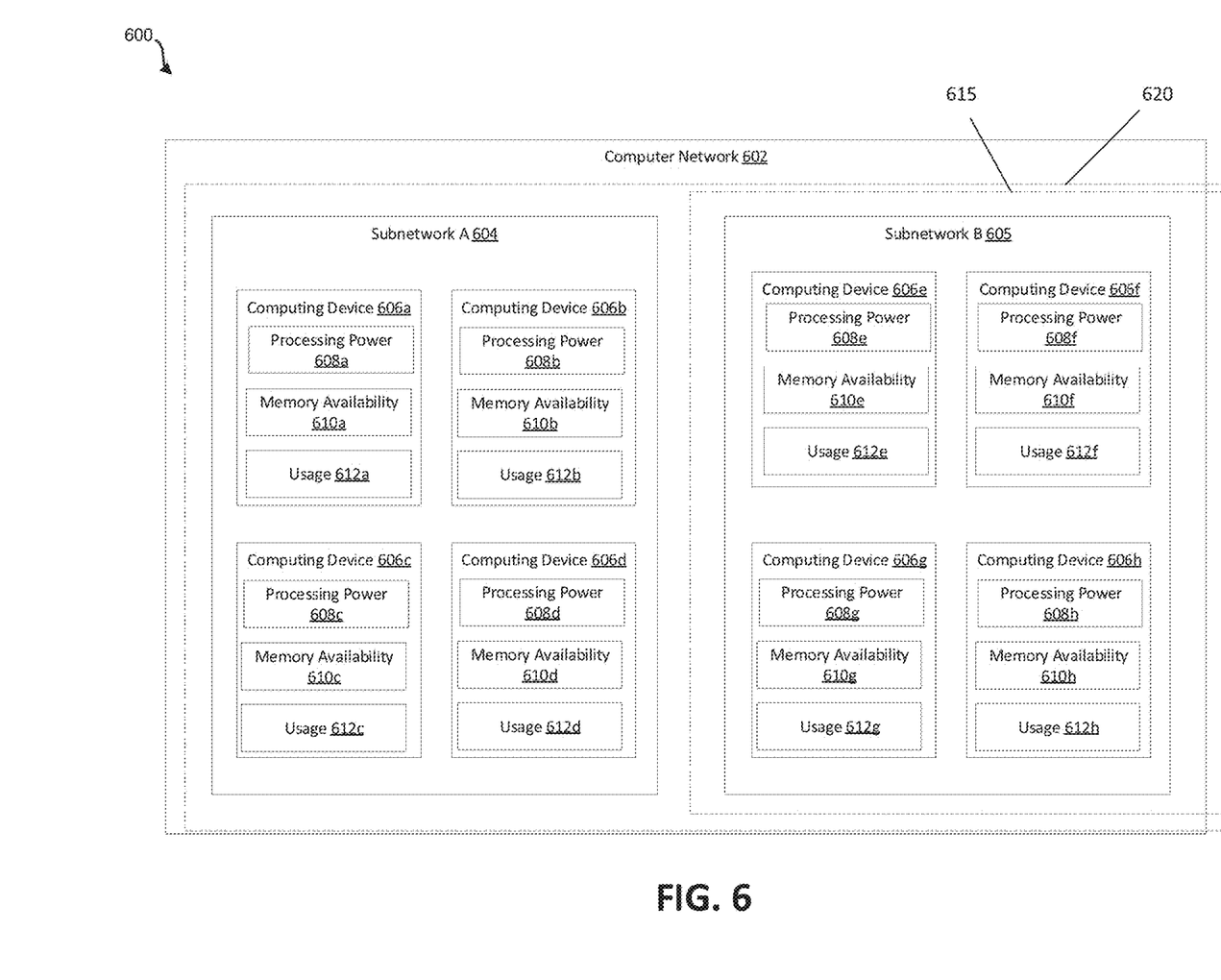
FIG. 6 is an example of a customizable user interface for providing holistic build data about a computer network according to one example of the present disclosure.

FIG. 6 is an example of a customizable user interface 600 for providing holistic build data about a computer network according to one example of the present disclosure. As illustrated, the user interface 600 provides holistic build data for computer network 602. The computer network 602 includes subnetwork A 604 and subnetwork B 605, but other numbers of subnetworks for the computer network 602 are possible. Additionally, the subnetwork A 604 and the subnetwork B 605 are illustrated with four different computing devices 606 each, though the subnetworks 604-605 may include any suitable amounts (and different amounts) of computing devices 606. And, each computing device 606 illustrated in the user interface 600 includes a respective processing power 608, memory availability 610, and usage 612. In some examples, the respective processing power 608, memory availability 610, and usage 612 may be included in the holistic build data and may be determined based on aggregating the network build sheets. For example, the respective usage 612 may be a projected usage at the time in the future for the respective computing device 606, etc.

In some examples, the user interface 600 may be generated for a first access level and separately for a second access level. The first access level may include view 615, which includes only subnetwork B 605 and excludes subnetwork A 604 (i.e., the first access level may not have access to the subnetwork A 604). Additionally, the second access level may include view 620, which includes all of the holistic build data displayed on the user interface 600. In a non-depicted example, a third access level may include a third view that is different from the view 615 and the view 620. For example, the third view may provide access to all of the subnetworks but may provide fewer details. As an example, the third view may provide the subnetwork A 604 and the subnetwork B 605 but may exclude one or more of the respective processing power 608, memory availability 610, or usage 612. Different access levels may be assigned different viewing privileges, so that the view presented can be tailored to each access level. This may allow different entities in an organization to view the information most relevant to them, and may hide certain information from unauthorized entities (e.g., for security or privacy reasons).

Although the subject matter has been described in language specific to structural features or methodological acts, it is to be understood that the subject matter defined in the appended claims is not necessarily limited to the specific features or acts described above. Rather, the specific features and acts described above are disclosed only for the purpose of illustration and description and they are not intended to be exhaustive or to limit the disclosure to the precise forms disclosed. Modifications, adaptations, and uses thereof will be apparent to those skilled in the art without departing from the scope of the disclosure. For instance, any examples described herein can be combined with any other examples.

The invention claimed is:

1. A system comprising:
   a processor device; and
   a non-transitory computer-readable memory including instructions that are executable by the processor device to perform operations comprising:
      receiving a plurality of network build sheets generated based on a plurality of network architectures, each network build sheet of the plurality of network build sheets corresponding to a proposed respective network architecture for a respective subpart of an overall computer network, the proposed respective network architecture indicating an anticipated future computing demand for the respective subpart of the overall computer network;
      aggregating the plurality of network build sheets to generate comprehensive build data for the overall computer network;
      generating, based on the comprehensive build data and for the overall computer network, a demand forecast that comprises a plurality of anticipated computing demands at a plurality of different points in time, the demand forecast indicating a trend of computing demand for the overall computer network; and
      initiating a computer hardware-acquisition operation for satisfying the generated demand forecast.

2. The system of claim 1, wherein the operations further comprise:
   receiving a request from a user to access a graphical user interface configured to display the comprehensive build data;
   determining an access level associated with the user; and
   generating the graphical user interface that includes a graphical representation of at least a portion of the comprehensive build data, the graphical representation being customized based on the access level associated with the user.

3. The system of claim 2, wherein the user is a first user, wherein the access level is a first access level, wherein the graphical representation is a first graphical representation, wherein the portion is a first portion, and wherein the operations further comprise:
   receiving a request from a second user to access the graphical user interface, wherein the second user is different than the first user;
   determining a second access level associated with the second user, wherein the second access level is different than the first access level; and
   providing a second graphical representation to the second user, the second graphical representation corresponding to a second portion of the comprehensive build data that is different from the first portion, the second graphical representation being customized based on the second access level associated with the second user.

4. The system of claim 1, wherein the operations further comprise outputting, via a graphical user interface, an amount of computer hardware for viewing by one or more users to facilitate initiating the computer hardware-acquisition operation.

5. The system of claim 1, wherein the operations further comprise executing a trained machine-learning model to determine the anticipated future computing demand for the respective subpart of the overall computer network.

6. The system of claim 1, wherein the operations further comprise determining, based on the anticipated future computing demand for the respective subpart of the overall computer network at a predetermined future time, an amount of computer hardware to acquire to satisfy the anticipated future computing demand for the respective subpart of the overall computer network at the predetermined future time.

7. The system of claim 1, wherein the operations further comprise:
   training a machine-learning model by:
      receiving a training dataset that includes historical build sheets and historical computing demand corresponding to the historical build sheets; and
      applying the training dataset to the machine-learning model to train the machine-learning model to output projections of anticipated computing demand; and
   executing the trained machine-learning model to determine the plurality of anticipated computing demands.

8. A method comprising:
   receiving, by a computing system, a plurality of network build sheets generated based on a plurality of network architectures, each network build sheet of the plurality of network build sheets corresponding to a proposed respective network architecture for a respective subpart of an overall computer network, the proposed respective network architecture indicating an anticipated future computing demand for the respective subpart of the overall computer network;
   aggregating, by the computing system, the plurality of network build sheets to generate comprehensive build data for the overall computer network;
   generating, by the computing system, and based on the comprehensive build data and for the overall computer network, a demand forecast that comprises a plurality of anticipated computing demands at a plurality of different points in time, the demand forecast indicating a trend of computing demand for the overall computer network; and
   initiating, by the computing system, a computer hardware-acquisition operation for satisfying the generated demand forecast.

9. The method of claim 8, further comprising:
   receiving a request from a user to access a graphical user interface configured to display the comprehensive build data;
   determining an access level associated with the user; and
   generating the graphical user interface that includes a graphical representation of at least a portion of the comprehensive build data, the graphical representation being customized based on the access level associated with the user.

10. The method of claim 9, wherein the user is a first user, wherein the access level is a first access level, wherein the graphical representation is a first graphical representation, wherein the portion is a first portion, and wherein the method further comprises:
receiving a request from a second user to access the graphical user interface, wherein the second user is different than the first user;
determining a second access level associated with the second user, wherein the second access level is different than the first access level; and
providing a second graphical representation to the second user, the second graphical representation corresponding to a second portion of the comprehensive build data that is different from the first portion, the second graphical representation being customized based on the second access level associated with the second user.

11. The method of claim 8, further comprising outputting, via a graphical user interface, an amount of computer hardware for viewing by one or more users to facilitate initiating the computer hardware-acquisition operation.

12. The method of claim 8, further comprising executing a trained machine-learning model to determine the anticipated future computing demand for the respective subpart of the overall computer network.

13. The method of claim 8, further comprising determining, based on the anticipated future computing demand for the respective subpart of the overall computer network at a predetermined future time, an amount of computer hardware to acquire to satisfy the anticipated future computing demand for the respective subpart of the overall computer network at the predetermined future time.

14. The method of claim 8, further comprising:
training a machine-learning model by:
receiving a training dataset that includes historical build sheets and historical computing demand corresponding to the historical build sheets; and
applying the training dataset to the machine-learning model to train the machine-learning model to output projections of anticipated computing demand; and
executing the trained machine-learning model to determine the plurality of anticipated computing demands.

15. A non-transitory computer-readable medium comprising instructions that are executable by a processor for causing the processor to perform operations comprising:
receiving a plurality of network build sheets generated based on a plurality of network architectures, each network build sheet of the plurality of network build sheets corresponding to a proposed respective network architecture for a respective subpart of an overall computer network, the proposed respective network architecture indicating an anticipated future computing demand for the respective subpart of the overall computer network;
aggregating the plurality of network build sheets to generate comprehensive build data for the overall computer network;
generating, based on the comprehensive build data and for the overall computer network, a demand forecast that comprises a plurality of anticipated computing demands at a plurality of different points in time, the demand forecast indicating a trend of computing demand for the overall computer network; and
initiating a computer hardware-acquisition operation for satisfying the generated demand forecast.

16. The non-transitory computer-readable medium of claim 15, wherein the operations further comprise:
receiving a request from a user to access a graphical user interface configured to display the comprehensive build data;
determining an access level associated with the user; and
generating the graphical user interface that includes a graphical representation of at least a portion of the comprehensive build data, the graphical representation being customized based on the access level associated with the user.

17. The non-transitory computer-readable medium of claim 16, wherein the user is a first user, wherein the access level is a first access level, wherein the graphical representation is a first graphical representation, wherein the portion is a first portion, and wherein the operations further comprise:
receiving a request from a second user to access the graphical user interface, wherein the second user is different than the first user;
determining a second access level associated with the second user, wherein the second access level is different than the first access level; and
providing a second graphical representation to the second user, the second graphical representation corresponding to a second portion of the comprehensive build data that is different from the first portion, the second graphical representation being customized based on the second access level associated with the second user.

18. The non-transitory computer-readable medium of claim 15, wherein the operations further comprise outputting, via a graphical user interface, an amount of computer hardware for viewing by one or more users to facilitate initiating the computer hardware-acquisition operation.

19. The non-transitory computer-readable medium of claim 15, wherein the operations further comprise determining, based on the anticipated future computing demand for the respective subpart of the overall computer network at a predetermined future time, an amount of computer hardware to acquire to satisfy the anticipated future computing demand for the respective subpart of the overall computer network at the predetermined future time.

20. The non-transitory computer-readable medium of claim 15, wherein the operations further comprise:
training a machine-learning model by:
receiving a training dataset that includes historical build sheets and historical computing demand corresponding to the historical build sheets; and
applying the training dataset to the machine-learning model to train the machine-learning model to output projections of anticipated computing demand; and
executing the trained machine-learning model to determine the plurality of anticipated computing demands.

* * * * *